May 5, 1959  B. F. McNAMEE  2,885,626
REGULATED VOLTAGE SUPPLY
Filed Nov. 23, 1955  2 Sheets-Sheet 1

BERNARD F. McNAMEE,
INVENTOR.

BY Reed Lawlor
ATTORNEY.

May 5, 1959
B. F. McNAMEE
2,885,626
REGULATED VOLTAGE SUPPLY
Filed Nov. 23, 1955
2 Sheets-Sheet 2
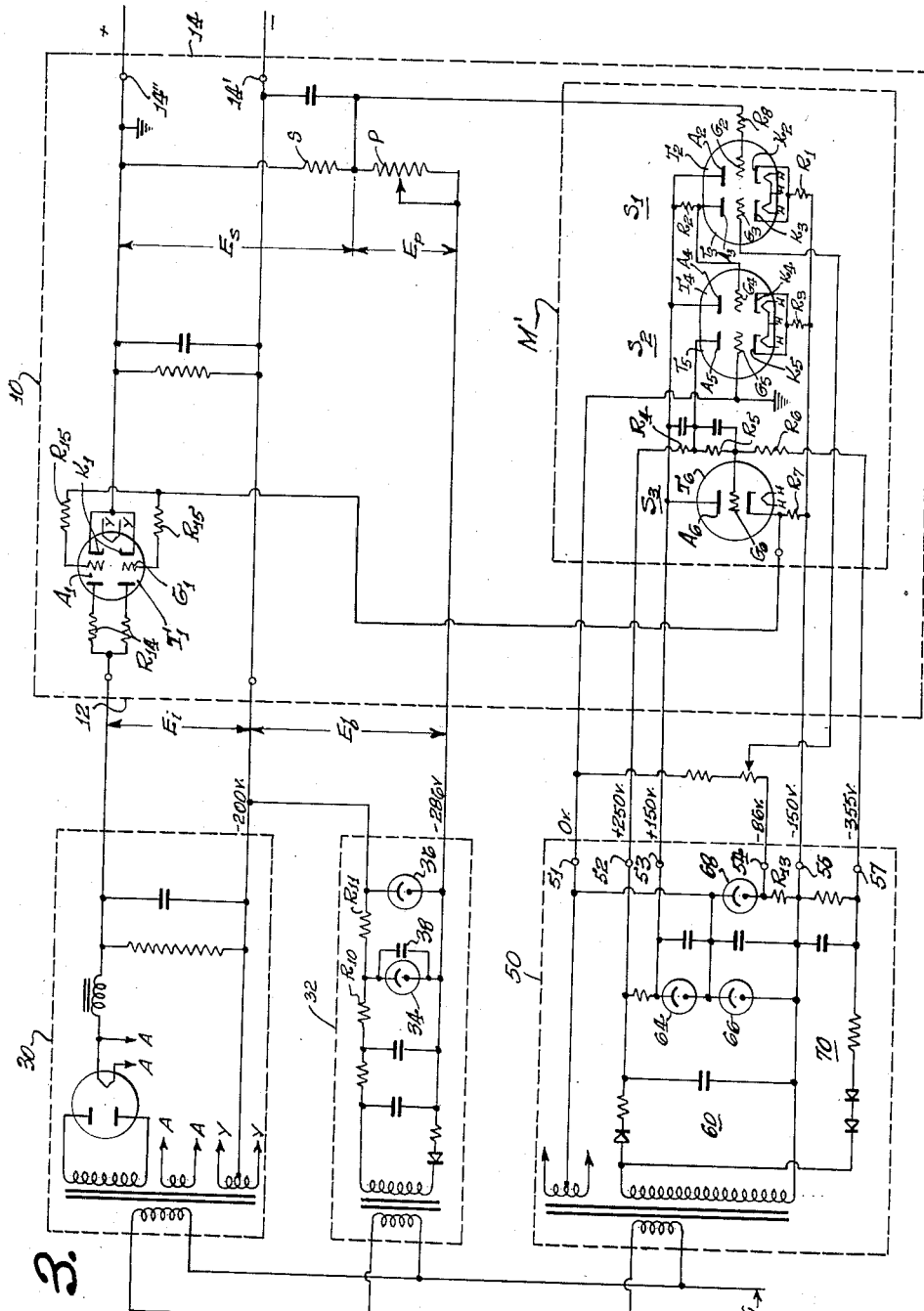
Fig. 3.
INVENTOR.
BERNARD F. McNAMEE,
BY
ATTORNEY.

United States Patent Office 2,885,626
Patented May 5, 1959

---

2,885,626

REGULATED VOLTAGE SUPPLY

Bernard F. McNamee, Altadena, Calif., assignor to Dressen-Barnes Corporation, Pasadena, Calif., a corporation of California Application November 23, 1955, Serial No. 548,664

9 Claims. (Cl. 323—22)

This invention relates to improvements in regulated voltage supplies.

A regulated voltage supply or voltage regulator is connected between a voltage source and a load, whenever it is desired to maintain the voltage applied to the load very nearly constant even though the voltage supplied by the source or the magnitude of the load varies over a wide range. Regulation is said to exist when the percentage change in voltage impressed upon the load is much smaller than it otherwise would be. There is a great demand for closely regulated voltage supplies.

Regulated voltage supplies which have been employed heretofore have frequently utilized a series regulator tube between the input and the output and an error amplifier that samples the output voltage and feeds it back in amplified form to the regulator tube in such a way as to change the resistance of the regulator tube in such a direction as to counteract a change in the output voltage. In this way the output voltage change that would otherwise occur is reduced, thereby regulating the output voltage and maintaining it nearly constant. The fraction of the output voltage which is thus impressed upon the amplifier has usually been sampled in the past by means of a voltage divider having a fixed impedance connected across the output. The fraction of the output voltage sampled for this purpose has frequently been adjusted by movement of a sliding contact of a potentiometer element connected in such a voltage divider. In such a system, a linear relationship cannot be obtained between the output voltage and the position of the sliding contact of the adjustable potentiometer except over a very narrow range. Furthermore, in such a system, the voltage applied across the anodes and the cathodes of the amplifier tubes of the error amplifier varies with the output voltage. As a result, maximum amplification and hence maximum regulation is obtained only over a small range of values of output voltage.

In accordance with the present invention, an output voltage sampling system is employed which makes it possible to vary the output voltage as a linear function of a variable resistance that is connected in the output. Furthermore, in accordance with this invention, the output voltage can actually be made proportional to the value of a variable resistance and can be varied over a wide range from zero volts to a large value of voltage without departing from such linearity and without impairing the action of the amplifier which feeds back the amplified voltage to the series regulator tube. By employing a calibrated resistor to supply the variable resistance, the voltage output is readily indicated by the setting of the variable resistor itself.

The various features of this invention which make it possible to achieve such a linear relationship between the adjustment of a variable resistor and the output voltage and which make it possible to vary the output voltage without affecting the amplification of the error amplifier will become apparent from a reading of the following description of a specific embodiment of the invention, wherein:

Fig. 3 illustrates in more detail a regulated D.C. voltage supply that employs a high gain error amplifier and that also employs rectifiers to supply various voltages required in the output voltage sampling circuit and in the error amplifier.

Figure 1:
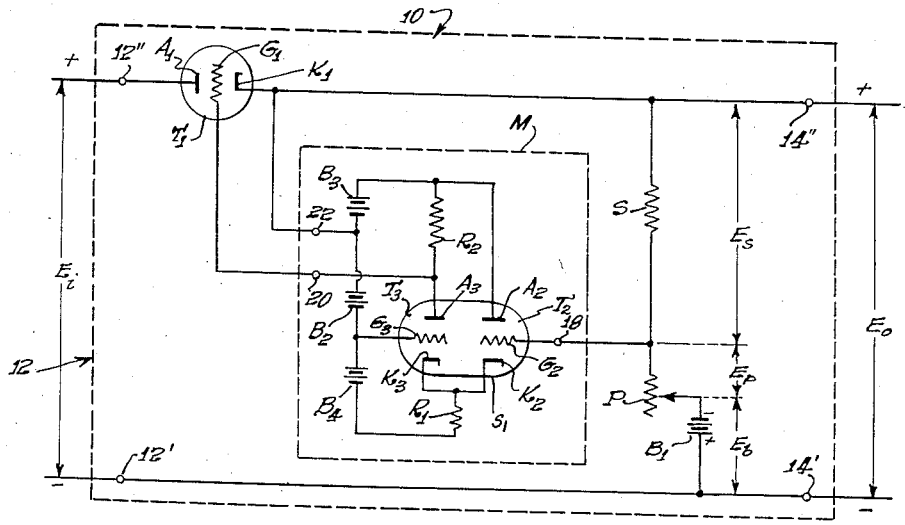
Figure 1 is a schematic diagram of a regulated D.C. voltage regulator supply embodying the present invention.

Referring to Fig. 1, a D.C. voltage regulator 10 embodying the present invention is illustrated. This voltage regulator has an input 12 having a pair of input terminals 12' and 12" and an output 14 having a pair of output terminals 14' and 14". An unregulated D.C. voltage $E_i$ is impressed upon the input with the upper terminal 12" being positive relative to the lower terminal 12'. A regulated D.C. voltage $E_o$ appears at the output with the upper terminal 14" being positive relative to the lower terminal 14'. Either output terminal may be grounded, but for convenience in explanation it is assumed that the upper output terminal is the one that is grounded. The two lower terminals 12' and 14' are connected together and are equivalent to a common input-output terminal. A series regulator in the form of a triode $T_1$ is connected between the input and the output, the anode $A_1$ being connected to the upper input terminal 12" and the cathode $K_1$ being connected to the upper output terminal 14".

A novel output voltage deviation sensing circuit is employed to sample changes in the output voltage. The sensing circuit of Fig. 1 employs fixed resistors, a variable resistor P, and a fixed reference voltage source such as a battery $B_1$, connected in series between the two output terminals 14' and 14". The resistor S is connected at the upper end of the output; that is, one end of the fixed resistor S is connected to the upper output terminal 14" and to the cathode $K_1$ of the regulator tube $T_1$.

An error amplifier is connected between the sensing circuit 16 and the regulator tube $T_1$ in order to regulate the output voltage. The error amplifier M has an input terminal 18 which is connected to the junction between the fixed resistor S and the variable resistor P. An output junction 20 is connected to the control grid $G_1$ of the series regulator tube $T_1$. A common input and output terminal 22 of the error amplifier M is connected to the output terminal 14" and to the cathode $K_1$ of the regulator tube.

With these connections, small changes in voltage that appear across the fixed resistor S are amplified by the error amplifier and are impressed upon the control grid $G_1$ of the regulator tube $T_1$ to produce the desired regulation. In order to produce such regulation, an overall phase inversion or polarity reversal is avoided between the input and the output of the error amplifier. With this arrangement, when an increase in voltage occurs across the fixed resistor S, the bias on the control grid $G_1$ relative to the cathode $K_1$ increases so that the resultant change in resistance of the regulator tube $T_1$ reduces the flow of current through the fixed resistor S. Similarly, when a decrease in voltage occurs across the fixed resistor S, the bias on the control grid $G_1$ relative to the cathode $K_1$ decreases so that the resultant change in resistance of the regulator tube $T_1$ increases the flow of current through the fixed resistor S. In this way, any tendency of the voltage across the resistor S to change from some predetermined or normal value is counteracted, and only small changes in output voltage occur even though a large change occurs in the input voltage or in the load. As indicated specifically hereinafter, the value of the voltage normally developed across the fixed resistor S is established by a standard voltage provided by a source connected to or within the error amplifier M.

With this system, the total voltage appearing across the output 14 is given by the following equation:

$$E_0 = E_s + E_p - E_b \quad (1)$$

where $E_s$ = voltage across fixed resistor S,
$E_p$ = voltage across resistor P, and
$E_b$ = reference voltage supplied by source $B_1$.

The error amplifier is so designed that no current flows into the error amplifier M. For this reason, the same current flows through the fixed resistor S, the variable resistor P, and the voltage source $B_1$. Under these conditions, the following relationship exists between the output voltage $E_0$, the substantially constant voltage $E_s$ across the resistor S, and the voltage $E_b$ supplied by the voltage source $B_1$, $$E_0 = \left(1 + \frac{P}{S}\right) E_s - E_b \quad (2)$$

where $P$ = resistance of variable resistor
$S$ = resistance of fixed resistor.

In other words, the output voltage is a linear function of the value of the portion of the variable resistance P that is connected in the sensing circuit. Furthermore, when the value of the voltage supplied by the voltage source $B_1$ is made equal to the value normally appearing across the fixed resistor S, the output voltage is proportional to the value of the resistance as indicated by the following equation:

$$E_0 = \frac{P}{S} E_s \quad (3)$$

It is to be noted that the voltage produced at the output can also be varied from any positive value to a higher positive value.

Figure 2:
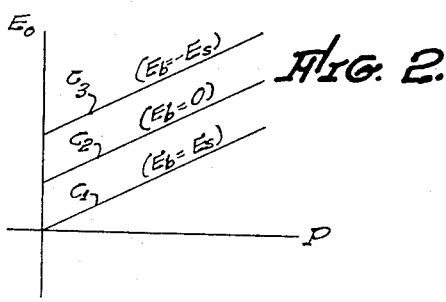
Fig. 2 is a graph employed in explaining the operation of the invention.

In Fig. 2, the curve $C_1$ illustrates how the output voltage varies with the value of the variable resistance P when the reference voltage supplied by voltage source $B_1$ is equal and opposite to the normal voltage $E_s$ appearing across the fixed resistor S. Graph $C_2$ indicates how the output voltage varies when no voltage is supplied from a voltage source $B_1$. Graph $C_3$ indicates how the output voltage $E_0$ varies with the value of the resistance of the variable resistor when the voltage supplied by the source $B_1$ is equal to the voltage normally existing across the fixed resistor S. It is to be noted that for all values of voltage supplied from the source $B_1$, the output voltage is a linear function of the resistance of the variable resistor P. In any event, the value of the voltage $E_b$ supplied by the reference voltage source $B_1$ determines the value of the output voltage $E_0$ that appears when the resistance of the resistor P is zero. It will be noted that the reference voltage establishes the intercept of each of the curves $C_1$, $C_2$ and $C_3$ with the $E_0$ axis, while the voltage across the fixed resistor S is very nearly equal to tte standard voltage. In effect, a change in the reference voltage provided by battery $B_1$ shifts the output voltage graph up or down in Fig. 2.

In some cases the graphs $C_1$, $C_2$ and $C_3$ may depart from linearity, if the voltage supplied to the input 12 is of too low a value or if the characteristics of the series regulator tube $T_1$ are such that the range of regulation is very small. However, by suitable selection of circuit constants and suitable selection of input voltage, the linear relationships illustrated in Fig. 3 may be obtained.

The error amplifier M illustrated in Fig. 1 employs a single cathode-coupled amplifier section $S_1$. This amplifier section comprises a duo-triode comprising an input triode $T_2$ and an output triode $T_3$, each having a corresponding anode $A_2$, $A_3$ a corresponding cathode $K_2$, $K_3$, and a corresponding control grid $G_2$, $G_3$. The control grid $G_2$ of the input triode is connected to the input terminal 18 of the error amplifier. The two amplifiers $K_2$ and $K_3$ are connected together and to one end of the cathode-coupling resistor $R_1$. A source of biasing voltage in the form of a battery $B_4$ is connected between the opposite end of the resistor $R_1$ and the control grid $G_3$ of the output triode $T_3$. A source of standard voltage such as a battery $B_2$ is connected between the control grid $G_3$ of the output tube $T_3$ and the cathode $K_1$ of the series regulator tube $T_1$. As mentioned above, the value of the voltage of this battery $B_2$ is employed to establish the normal value of the voltage $E_s$ across the fixed resistor S. A source of anode voltage such as a battery $B_3$ is connected between the common input-ouput terminal 22 and the anode $A_2$ of the input triode $T_2$. The battery $B_3$ is also connected to the anode $A_3$ of the output triode $T_3$, but through a load resistor $R_2$. The junction between the anode $A_3$ of the output triode and the resistor $R_2$ is connected to the output terminal 20 of the error amplifier. The two grids $G_2$ and $G_3$ are biased negatively compared with the cathodes so that no substantial current flows through the input terminal 18. The value of the resistor $R_1$ is established at a high value compared with the internal resistance of the two triodes so that the gain of the input amplifier stage comprising the triode $T_2$ is nearly unity.

Such a cathode-coupled amplifier operates in such a way that the two control grids $G_2$ and $G_3$ are maintained at about the same voltage relative to the cathodes $K_2$ and $K_3$. By virtue of the characteristics of the error amplifier M, the output appearing at the terminals 20 and 22 operates to control the resistance of the series regulator tube $T_1$ in such a way as to maintain the voltage $E_s$ across the fixed resistor S substantially equal to the reference voltage supplied by the battery $B_1$. By setting the value of the resistance $R_2$ at such an amount that the voltage drop through the resistance $R_2$ nearly equals the voltage supplied by the battery $B_3$, when the voltage applied to the input 12 has its minimum voltage, the control voltage $E_c$ will be nearly zero, thus establishing the minimum resistance of the triode $T_1$. The value of the resistor $R_2$ is set to correspond to the minimum value of voltage that may be applied to the input 12 of the voltage regulator 10. Thereafter, whenever a higher voltage is supplied to the input 12, the error amplifier M supplies a control voltage $E_c$ to the series regulator tube $T_1$ to increase its resistance and to maintain the voltage $E_s$ across the fixed resistor S at very nearly the same value.

It is to be noted that the voltages on the cathodes $K_2$ and $K_3$, the grids $G_3$ and $G_4$, and anodes are established by means of circuits that are connected directly to the positive output terminal 14″. These voltages are not altered by any change in the value of the variable resistor P or in the value of the reference voltage established by the source $B_1$. They are thus anchored to the positive output terminal. Actually, of course, the voltages on the cathodes $K_2$ and $K_3$ and the input control grid G vary slightly in operation because of the slight changes in current drawn through the fixed resistors. But because the cathodes and control grids are not connected directly to the terminal 14′, they float with respect to that terminal, as is evident when the resistance of resistor P or the reference voltage is changed.

The maximum voltage over which regulation may be obtained is determined very largely by the characteristics of the regulator tube, and more particularly by the point of operation of the regulator tube beyond which a change in voltage drop produced across the regulator tube $T_1$ that can be produced by the action of the error amplifier fails to equal the increase in input voltage. This point normally occurs when the resistance of the regulator triode attains nearly its maximum value.

Due to the regulatory action, the voltage $E_s$ across the fixed resistor S is maintained very nearly equal to the standard voltage supplied by the battery $B_2$. For this reason, in order to obtain close regulation, the battery $B_2$ or other voltage supply that supplies the standard voltage is of a type which is free from any substantial instability. A high degree of stability of the voltages supplied by the batteries $B_3$ and $B_4$ is not required because, at least for small changes in the values of these voltages, the circuits of the error amplifier are self-compensating. However, the voltage of the reference source $B_1$ must be accurately maintained.

The effectiveness of the voltage regulator, that is, the degree or closeness of regulation of the voltage $E_s$, depends upon the amplification of the error amplifier M. For this reason, it is sometimes desirable to employ a multiple-section amplifier instead of a single-section amplifier. A voltage regulating system including such a multiple-section amplifier is illustrated in Fig. 3. In the regulator illustrated in that figure, the sources of voltage illustrated as batteries in Fig. 1 are provided by voltage sources that employ voltage regulator tubes of the gaseous discharge type.

The regulated voltage supply of Fig. 3 is of a type which is adapted to convert alternating current voltage supplied from a source V such as the house mains into a closely regulated D.C. voltage. For convenience, in correlating elements which appear in Fig. 3 with corresponding elements in Fig. 1, in many cases the same symbols are employed in Fig. 3 as in Fig. 1. In other cases, where it is desirable to draw a distinction, the same symbols are employed as in Fig. 1, but with prime symbols as superscripts.

In the system of Fig. 3, a first rectifier 30 is employed to convert the A.C. voltage supplied from house mains V into a D.C. voltage which is impressed upon the input 12 of the voltage regulator 10. The rectifier 30 converts the A.C. voltage having an R.M.S. value of 115 volts into a D.C. voltage $E_1$ of 200 volts at its output.

The voltage source $B_1$ which provides the reference voltage $E_b$ comprises a second rectifier 32, the output of which is closely regulated by a pair of regulator tubes 34 and 36. The first regulator tube 34 is connected across the output of the rectifier through a 5.6 k$\omega$ resistor $R_{10}$. The second regulator tube 36 is connected across the first regulator tube through a 27 k$\omega$ resistor $R_{11}$. A capacitor 38 having a capacitance of 0.01 $\mu\mu$F shunts the first voltage regulator tube 34. The two voltage regulator tubes 34 and 36 are of type OA2 and 5651 respectively. The voltage $E_b$ developed across the output of the voltage source $B_1$ is 86 volts.

A power supply 50, the output of which is also closely regulated by regulator tubes, is employed to provide the voltages of voltage sources $B_2$, $B_3$, and $B_4$. For reasons which will appear hereinafter, the power supply 50 has seven output terminals 51, 52, 53, 54, 56, and 57 which deserve special mention. The terminal 51 is connected to the center tap of the secondary winding of a filament transformer which supplies electrical energy to the filaments of the various tubes that form part of the error amplifier M'. One rectifier 60 supplies positive D.C. voltages to the terminals 51, 52, 53, and 54 relative to terminal 56. A second rectifier 70 supplies a negative D.C. voltage to terminal 57 relative to terminal 56. More particularly, the rectifier 70 supplies a D.C. voltage of 300 volts across the terminals 56 and 57, the terminal 57 being negative with respect to the terminal 56.

A 5.6 k$\omega$ resistor $R_{12}$ and two regulator tubes 64 and 66 are connected in series across the output of the rectifier 60. The terminals 52 and 56 are connected to the positive and negative ends respectively of the rectifier 60. The voltage of the terminal 52 is 400 volts positive relative to that of terminal 56. The two regulator tubes 64 and 66 are of type OA2, thus being effective to produce a voltage of 150 volts across each of them. The terminal 53 is connected to the junction between the 5.6 k$\omega$ resistor and the two regulator tubes 64 and 66. The voltage of the terminal 53 is thus 300 volts positive relative to that of the terminal 56.

The junction between the two regulator tubes 64 and 66 is connected to the terminal 51, so that the terminal 51 is 150 volts positive with respect to the terminal 56, making the voltage of terminal 56 150 volts negative with respect to ground. A third regulator tube 68 is connected in series with a 27 k$\omega$ resistor $R_{13}$ across the regulator tube 66, thus being likewise connected between the terminals 51 and 56. The regulator tube 68 is of the type 5651, thus being adapted to produce a voltage of 86.0 volts across it, this voltage of necessity being less than that appearing across the regulator tube 66. Terminal 54 is thus 86.0 volts negative with respect to terminal 51, and this voltage is highly regulated by the action of the regulator tubes 68 and 66.

The error amplifier M' of the circuit of Fig. 3 is very similar to the error amplifier M of the circuit of Fig. 1, except that it comprises more sections and therefore has higher gain. More particularly, the error amplifier M' comprises amplifier sections $S_1$, $S_2$, and $S_3$. The section $S_1$ is substantially identical to the amplifier section $S_1$ of the error amplifier M, except that the voltages are supplied to it by the power supply 50 instead of by batteries. The second section $S_2$ is similar to the section $S_1$, but is employed to amplify the signal appearing at the output of the amplifier section $S_1$. The amplifier section $S_3$ is a cathode-follower amplifier and is connected between the output of the amplifier section $S_2$ and the control grids $G_1$, $G_1$ of a duo-triode series regulator tube $T_1$, $T_1$ in order to achieve a satisfactory impedance match and isolation. A pair of 47 $\omega$ resistors $R_{14}$ are connected between the anodes $A_1$, $A_1$ of the regulator tube $T_1$, $T_1$, and a pair of 1 k$\omega$ resistors $R_{15}$ are connected between the respective control grids $G_1$, $G_1$ of the regulator tube $T_1$, $T_1$ and the output terminal 22' of the error amplifier M'.

As in the error amplifier M of Fig. 1, the first amplifier section $S_1$ comprises triodes $T_2$ and $T_3$. The amplifier section $S_2$, which is very similar to amplifier section $S_1$, comprises triodes $T_4$ and $T_5$. The last amplifier section $S_3$ comprises a triode $T_6$. A cathode resistor $R_3$ is connected to the triodes $T_3$ and $T_4$, and a plate resistor $R_4$ is connected to the anode of the triode $T_4$. The output terminal 14" is also grounded.

Voltage is supplied to the anodes $A_2$, $A_3$, $A_4$, and $A_6$ of the triodes $T_2$, $T_3$, $T_4$, and $T_6$ by connection to the power supply terminal 53. It is to be noted that a resistor $R_2$ is connected between the anode of the triode $T_3$ and the terminal 53, as was the case in Fig. 1. Voltage for the anode of triode $T_5$ is supplied by connecting the terminal 52 to the anode through a resistor $R_4$.

The fixed resistor S and the variable resistor P are connected in series between the output terminal 14" of the voltage regulator and the negative terminal of the power supply $B_1$, and the junction between the resistors S and P is connected to the control grid $G_2$ of the input triode $T_2$ through a resistor $R_8$. Cathode resistors $R_1$, $R_3$, and $R_7$ connected in the respective amplifier sections $S_1$, $S_2$, and $S_3$ are all connected at one end to the terminal 56. The voltages on the cathodes of the various triodes are thus established by the values of these cathode resistors and the values of the currents normally drawn through these triodes. Resistors $R_5$ and $R_6$ are connected in series with resistor $R_4$ and to the terminal 57 to establish the voltage on the control grid $G_6$ of the triode $T_6$ by virtue of the connection of this control grid to the junction between the resistors $R_5$ and $R_6$. The output of the cathode-follower triode $T_6$ appears across the cathode resistor $R_7$.

The output from the amplifier section $S_1$ is supplied to the input triode $T_4$ of the amplifier section $S_2$ by means of the direct connection from the anode $A_3$ to the control grid $G_4$. The output of the second amplifier section $S_2$ is applied to the cathode follower section $S_3$ by connecting the anode $A_5$ to the control grid $T_6$ of the triode $T_6$ through the resistor $R_5$. The control grid $G_5$ of the triode $T_5$ is connected to the terminal 51, thus being grounded.

A large resistor $R_9$ and a potentiometer $R_{10}$ are connected in series across the voltage regulator tube 68. The sliding contact of the potentiometer $R_{10}$ is connected to the control grid $G_3$ of the triode $T_3$. In this way a voltage slightly less than that appearing across the regulated tube 68 is applied between the terminal 51 and the control grid $G_3$. This voltage, it is to be noted, constitutes the standard voltage $B_2$ of Fig. 1. In this case, as in Fig. 1, the system tends to maintain the grids $G_2$ and $G_3$ at the same voltage. Thus, since the grid $G_3$ is connected to ground through the resistors $R_{10}$ and $R_9$ and the grid $G_2$ is connected to ground through the fixed resistor S, the voltage across the fixed resistor S is stabilized to equal very nearly the voltage across the resistor $R_9$ and the potentiometer $R_{10}$. The latter voltage, it will be understood, is very nearly constant because of the action of the regulator tubes 64, 66, and 68. It will be noted that all the voltages on all the control electrodes are anchored with respect to the upper output terminal 14" and float with respect to the lower output terminal 14'.

It is to be noted that a 10 $\mu\mu$F capacitor and a 6 k$\omega$ resistor are connected in parallel across the output 14 in order to assure satisfactory operation of the regulated voltage supply when the load is removed from the output.

When employing the error amplifier M' of Fig. 3, if a change in voltage occurs at the input 12 or a change in load appears at the output 14, the error amplifier M' cooperates with the series regulator tube $T_1$, $T_1$ to maintain the voltage across the fixed resistor S equal to the constant predetermined value established by the power supply 50 across the resistor $R_9$ and potentiometer $R_{10}$.

If the voltage applied to the input 12 or the impedance connected across the output 14 increases, the voltage across the output 14 also increases. As a result, the voltage across the fixed resistor S increases, increasing the negative voltage on the grid $G_2$ of the triode $T_2$. An amplified negative signal appearing at the anode $A_3$ of the triode $T_3$ is applied to the triode $T_4$. Again, an amplified negative signal appearing at the anode $A_5$ of the triode $T_5$ is applied to the cathode-follower tube $T_6$. The output signal appearing across the cathode resistor $R_7$ of the cathode-follower tube $T_6$ is applied through 1 k$\omega$ resistor $R_{15}$ to the control grids $G_1$, $G_1$ of the series regulator tube $T_1$, $T_1$, increasing the resistance of the regulator tube $T_1$, $T_1$, thereby opposing or counteracting any tendency of the voltage appearing at the output to increase.

As a result, the voltage appearing at the output 14 of the voltage regulator is maintained very nearly equal to the value $$E_0 = E_s\left(1 + \frac{P}{S}\right) - E_b \quad (5)$$

In a typical case, the various tubes of the error amplifier M' were of the following types:

| Tube: | Type |
|---|---|
| $T_1$ | 6BG7 |
| $T_2$, $T_3$ | 12AX7 |
| $T_4$, $T_5$ | 12AX7 |
| $T_6$ | 6AB4 |

And the elements of the error amplifier M' and the zeroing circuit had the following values:

| Element: | Typical value |
|---|---|
| S | k$\omega$ -- 85 |
| P | k$\omega$ maximum -- 100 |
| $R_1$ | k$\omega$ -- 27 |
| $R_2$ | meg$\omega$ -- 1 |
| $R_3$ | k$\omega$ -- 120 |
| $R_4$ | k$\omega$ -- 470 |
| $R_5$ | meg$\omega$ -- 3.3 |
| $R_6$ | meg$\omega$ -- 6.8 |
| $R_7$ | k$\omega$ -- 100 |
| $R_8$ | k$\omega$ -- 100 |
| $R_9$ | k$\omega$ -- 470 |
| $R_{10}$ | k$\omega$ -- 5 |

Other elements may be employed in the error amplifier and the rectifiers to provide stability and other desirable characteristics in accordance with well known principles. Typical elements are shown in the rectifier, etc., and in some cases actual values are specified in the drawing.

With such a system, the voltages of various elements relative to ground had the following typical values:

| Element: | Voltage |
|---|---|
| Input 12 | |
| Output 14 (maximum) | 100 |
| $K_1$ | 0 |
| $G_1$ | −60 |
| $A_1$ (approx.) | +200 |
| $K_2$ | −85 |
| $G_2$ | −86 |
| $A_2$ | +150 |
| $K_3$ | −85 |
| $G_3$ | −86 |
| $A_3$ | 0 |
| $K_4$ | +2 |
| $G_4$ | 0 |
| $A_4$ | +150 |
| $K_5$ | +2 |
| $G_5$ | 0 |
| $A_5$ | +80 |
| $K_6$ | −60 |
| $G_6$ | −63 |
| $A_6$ | +150 |

A 1 $\mu$f. capacitor is connected between the junction between the resistors S and P and the negative output terminal 14'. This capacitor acts to feed back any 120 c.p.s. ripple appearing in the output 14 to the input of the error amplifier regardless of how the value of the variable resistor P is altered. In effect, the variable resistor P is short-circuited to the negative terminal 14' at such frequencies. As a result, rapid changes in output voltage and changes at high frequency are suppressed. So far as such rapid or high frequency changes are concerned, the value of P in the equation above is zero. As a result, the rapid or high fluctuations appearing at the output voltage are only those residual fluctuations which appear in the reference voltage $E_4$ and the voltage $E_b$.

In use, the variable resistor P is initially set at zero. Then the potentiometer $R_{10}$ is adjusted to produce zero output voltage across the output 14. Thereafter, as the value of the resistance P is varied, the voltage across the output 14 is changed in direct proportion to the value of the resistance P. With the specific circuit described, the output voltage can vary from zero to 100 volts. Furthermore, by employing a resistor P having the maximum value indicated, the value of the output voltage can be read directly from the calibrated value of resistance indicated directly on the resistor P. For this reason, a calibrated resistor P, such as a "Helipot," which is shorted between one end and the sliding contact, may be employed in order to produce direct and accurate indications of the output voltage.

Figure 4:
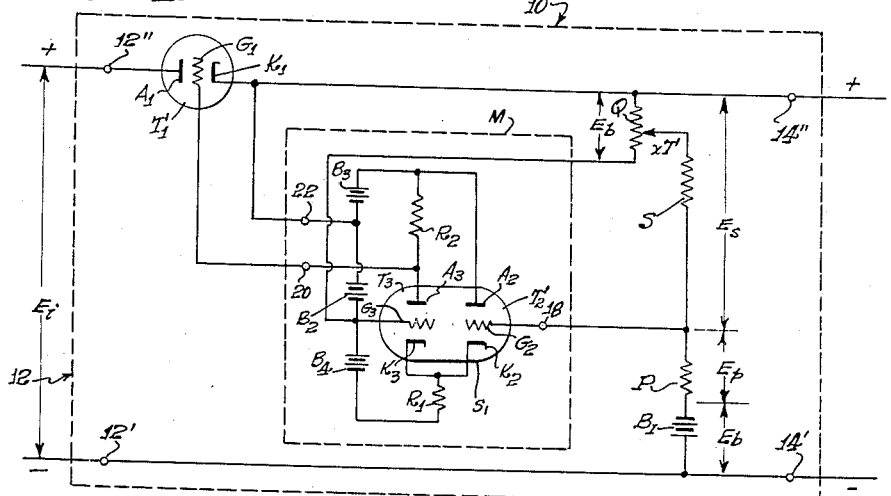
Fig. 4 is a schematic diagram of an alternative embodiment of the invention.

In Fig. 4 there is illustrated another embodiment of the invention which is particularly suitable for use when higher values of output voltage are to be produced. This embodiment of the invention is similar to that illustrated in Fig. 1 except that the resistor P, as well as the resistor S, is fixed, and a variable voltage established by a potentiometer Q is inserted between the resistor S and the output terminal 14″. In such a modification of the circuit of Fig. 1, the potentiometer Q is connected between the output terminal 14″ and the grid $G_3$. In this way, a fixed voltage equal to the standard voltage established by the voltage source $B_2$ is produced across the potentiometer Q as well as across the resistor S and the part of the potentiometer Q that is connected between the terminal 14 and the control grid $G_2$. With this arrangement, it can be shown that, when the voltages supplied by sources $B_2$ and $B_1$ are equal, the output voltage is given very nearly by the formula:

$$E_0 = (1-x)\frac{P}{S}E_s \qquad (6)$$

where $1-x$ = fraction of potentiometer Q connected in series with resistor S and resistor P across the output.

The output voltage produced in this way departs somewhat from linearity. This is due to the fact that current that flows through the resistors S and P also flows through the potentiometer Q. It can be shown that the departure from linearity can be reduced by increasing the value of resistors P and S compared with the resistance of the potentiometer Q. In a practical case in which the output voltage was caused to vary from 0 to 500 volts, the values of Q, P, and S were established as follows:

P _____ meg$\omega$__ 1
Q _____ k$\omega$__ 50
S _____ k$\omega$__ 170

In this case, a departure of the output voltage as a function of the setting of a linear potentiometer from linearity was less than a few percent.

As used herein, the term "reference voltage" is employed to identify the voltage of the battery $B_1$ which establishes the output voltage $E_0$ when the resistance of the resistor P is zero. And as used herein, the term "standard voltage" refers to the voltage of the battery $B_2$ to which the sampled portion of the output voltage is compared.

The following abbreviations have been employed in the foregoing description:

A.C. _____ Alternating current.
D.C. _____ Direct current.
$\omega$ _____ Ohms.
K$\omega$ _____ Kilohms.
Meg$\omega$ _____ Megohms.
$\mu$F _____ Microfarad.
$\mu\mu$F _____ Micromicrofarad.

Though the invention has been described herein only with reference to specific embodiments thereof, it will be understood that the invention may be embodied in other forms. For example, types of voltage regulating elements other than a series regulator tube may be employed to introduce the desired reduction of voltage between the input and the output of the regulator and the desired regulation. Also, for example, it will be understood that, even though the invention has been described with particular reference to its application to the production of a regulated D.C. voltage, it may also be applied to the production of other types of regulated voltages. It will also be understood that the invention is not restricted in its use to the employment of the type of error amplifier specifically described, though that is the best type of error amplifier to employ that has so far been discovered.

Furthermore, while the invention has been specifically described with reference to a practical embodiment which permits the voltage at the output to be varied from zero to 100 volts and at the same time to be correctly indicated by the reading of the calibrated indicating resistor P, it is also possible to vary the voltage over other ranges, as indicated by the graphs of Fig. 2, and to calibrate the indicating resistor P accordingly to read output voltage directly.

In the foregoing description, the invention has been described only with reference to a voltage regulator designed to produce an output voltage of variable magnitude. For such purposes the resistance P is made variable.. It will be understood, however, that some of the advantages of the invention may be attained where the value of the resistance P is fixed and therefore the output of the regulated voltage supply is substantially constant. With such an arrangement, the voltages applied to the various elements of the error amplifier remain fixed so that the gain of the error amplifier remains constant regardless of the value of the regulated output voltage.

It will therefore be understood that the invention is not limited to the particular embodiments described herein, but that it may be embodied in many other forms without departing from the principles of the invention. Various changes which will now suggest themselves to those skilled in the art may be made in the circuit without departing from the invention as defined by the appended claims.

The invention claimed is:

1. In a regulated voltage supply having an input adapted for connection to an unregulated D.C. voltage source and having an output: shunt circuit means including resistance means and a reference voltage source connected in series across said output; amplifying means having an input connected across at least a portion of said resistance means but not across said reference voltage source and also having an output; a series regulating element connected between the input and the output of said voltage supply and controlled by the output of said amplifying means for regulating the voltage appearing across the output of said voltage supply and across said shunt circuit means; said resistance means including a variable resistor having a variable part connected in said shunt circuit means for adjusting the value of the D.C. voltage appearing across the output of the regulated voltage supply; and a standard voltage source connected in said amplifying means for establishing the value of the voltage appearing across said portion of said resistance means at a value that is substantially independent of the setting of said variable resistor whereby the voltage produced across the output of the regulated voltage supply is a substantially linear function of the resistance of said variable part of said resistor.

2. In a regulated voltage supply having an input adapted for connection to an unregulated D.C. voltage source and having an output: shunt circuit means including a fixed resistor, a variable resistor, and a reference voltage source connected in series across said output; amplifying means having an input connected across at least a portion of said fixed resistor but not across said variable resistor or said reference voltage source and also having an output; a series regulating element connected between the input and the output of said voltage supply and controlled by the output of said amplifying means for regulating the voltage appearing across the output of said voltage supply and across said shunt circuit means; and a standard voltage source connected in said amplifying means for establishing the value of the voltage appearing across said portion of said resistance means at a value that is substantially independent of the setting of said variable resistor whereby the voltage produced across the output of the regulated voltage supply is a substantially linear function of the resistance of said resistor.

3. In a regulated voltage supply having an input for connection to an unregulated D.C. voltage source and having an output: shunt circuit means including resistance means and a reference voltage source connected in series across said output, said resistance means including a variable resistor having a variable part connected in said shunt circuit means for adjusting the value of the voltage appearing across said output; a series regulating element connected between said input and said output; and amplifying means having an input connected across at least a portion of said resistance means but not across said reference voltage source and having an output connected to said regulating element for regulating the voltage appearing across said output and said shunt circuit, whereby said output voltage varies as a substantially linear function of the resistance of said variable part of said resistor.

4. In a regulated voltage supply having an input for connection to an unregulated D.C. voltage source and having an output: shunt circuit means including resistance means and a reference voltage source connected in series across said output, said resistance means including a variable resistor having a variable part connected in said shunt circuit means for adjusting the value of the voltage appearing across said output; a series regulating element connected between said input and said output; amplifying means having an input connected across at least a portion of said resistance means but not across said reference voltage source and having an output connected to said regulating element for regulating the voltage appearing across said output of the regulated voltage supply; and a standard voltage source connected in said amplifying means for establishing the value of the voltage appearing across said portion of said resistance means at a value that is substantially independent of the setting of said variable resistor, whereby the voltage produced across the output of the regulated voltage supply is a substantially linear function of the resistance of said variable resistor.

5. In a regulated voltage supply having positive and negative terminals at its input adapted for connection to an unregulated voltage source and having positive and negative output terminals at its output, and adapted to produce a regulated output voltage across said output: an output voltage deviation sensing circuit connected across said output terminals for detecting a change in the magnitude of the output voltage, said sensing circuit comprising resistance means and a reference voltage source connected in series between said positive and negative output terminals, said resistance means being connected directly to the positive output terminal, said resistance means including a variable resistance means for adjustably setting the value of the output voltage; amplifying means having an input connected across at least a part of said resistance means but not across said reference voltage source; and a regulating element connected between said positive terminals and controlled by the output of said amplifying means to regulate the voltage appearing across said output terminals, said amplifying means including standard voltage supply means for maintaining said voltage across the input of said amplifying means substantially constant irrespective of the setting of the output voltage, whereby the value of the output voltage appearing across said output terminals varies as a substantially linear function of the resistance of said resistance means.

6. In a regulated voltage supply having positive and negative terminals at its input adapted for connection to an unregulated voltage source and having positive and negative output terminals at its output and adapted to produce a regulated output voltage across said output: a cathode coupled amplifier having an input section comprising an input control element and an input anode element, and an output section comprising an output control element and an output anode element; an output voltage deviation sensing circuit connected across said output terminals for detecting a change in the magnitude of the output voltage, said sensing circuit comprising resistance means and a reference voltage source connected in series between said positive and negative output terminals, said resistance means including a variable resistor, at least a part of said resistance means being connected between said input control element and said positive output terminal, said reference voltage source being connected between said input control element and said negative output terminal; a standard voltage source connected between said output control element and said positive output terminal; means connected between said anode elements and said positive output terminal for anchoring the voltages of the elements of said amplifier with respect to said positive output terminal and for floating said elements of said amplifier with respect to said negative output terminal; and a regulating element connected between said positive terminals and controlled by the output of said amplifier whereby the voltage appearing between said positive output terminal and said input control element is maintained substantially constant and the output voltage appearing between said output terminals varies as a substantially linear function of the resistance of said variable resistor.

7. A regulated voltage supply as defined in claim 6 in which said variable resistor is connected between said input control element and said negative output terminal.

8. A regulated voltage supply as defined in claim 7 comprising a potentiometer having a moving contact and having its ends connected between said positive output terminal and said output control element and in which the part of said potentiometer between said positive output terminal and said moving contact forms said variable resistor.

9. In a regulated voltage supply having positive and negative terminals at its input adapted for connection to an unregulated voltage source and having positive and negative output terminals at its output and adapted to produce a regulated output voltage across said output; a cathode coupled amplifier having an input section comprising an input control element and an input anode element, and an output section comprising an output control element and an output anode element; an output voltage deviation sensing circuit connected across said output terminals for detecting a change in the magnitude of the output voltage, said sensing circuit comprising resistance means and a reference voltage source connected in series between said positive and negative output terminals, said resistance means including a variable resistor, at least a part of said resistance means being connected between said input control element and said positive output terminal, said reference voltage source being connected between said input control element and said negative output terminal; a standard voltage source connected between said output control element and said positive output terminal, said standard voltage source having substantially the same voltage as said reference voltage source; means connected between said anode elements and said positive output terminal for anchoring the voltages of the elements of said amplifier with respect to said positive output terminal and for floating said elements of said amplifier with respect to said negative output terminal; and a regulating element connected between said positive terminals and controlled by the output of said amplifier whereby the voltage appearing between said positive output terminal and said input control element is maintained substantially constant and the output voltage appearing between said output terminals varies substantially in proportion to the value of the resistance of said variable resistor.

References Cited in the file of this patent

UNITED STATES PATENTS

| | | |
|---|---|---|
| 2,435,961 | Gibbons et al. | Feb. 17, 1948 |
| 2,579,816 | Gluyas | Dec. 25, 1951 |
| 2,594,006 | Friend | Apr. 22, 1952 |